United States Patent [19]

Brodbeck

[11] Patent Number: 5,006,002

[45] Date of Patent: Apr. 9, 1991

[54] PORTABLE PRINTING APPARATUS WITH MOVABLE PAPER FEED GATE

[75] Inventor: Robert M. Brodbeck, Denver, Colo.

[73] Assignee: Clancy Systems International, Inc., Denver, Colo.

[21] Appl. No.: 336,128

[22] Filed: Apr. 11, 1989

[51] Int. Cl.$^5$ .............................................. B41J 11/58
[52] U.S. Cl. ................................. 400/613.2; 400/88
[58] Field of Search .................. 400/88, 613, 690.4, 400/691, 692, 693, 613.2; 101/288; 206/305, 371, 576; 312/208; 346/136, 145; 364/708; 400/613.2

[56] References Cited

U.S. PATENT DOCUMENTS

| | | | |
|---|---|---|---|
| 3,051,408 | 8/1962 | Finch | 346/145 |
| 3,294,212 | 12/1966 | Gearheart et al. | 346/145 |
| 4,560,995 | 12/1985 | Suga et al. | 346/136 |
| 4,568,211 | 2/1986 | Fox et al. | 400/693 |
| 4,586,838 | 5/1986 | Hara et al. | 400/693 |
| 4,592,669 | 6/1986 | Lohse et al. | 400/693 |
| 4,674,056 | 6/1987 | Goodfellow | 400/88 |
| 4,739,316 | 4/1988 | Yamaguchi et al. | 400/690.4 |
| 4,790,431 | 12/1988 | Reel et al. | 400/691 |
| 4,837,590 | 6/1989 | Sprague | 400/691 |
| 4,845,650 | 7/1989 | Meade et al. | 364/708 |
| 4,871,269 | 10/1989 | Murata | 101/288 |
| 4,877,197 | 10/1989 | Nelson et al. | 400/613 |
| 4,881,839 | 11/1989 | Grimm | 400/692 |
| 4,884,084 | 11/1989 | Greenhut | 346/136 |
| 4,896,776 | 1/1990 | Kabanuk | 206/305 |

FOREIGN PATENT DOCUMENTS

| | | | |
|---|---|---|---|
| 87384 | 5/1982 | Japan | 400/613.2 |
| 103872 | 6/1982 | Japan | 400/613.2 |
| 3888 | 1/1983 | Japan | 400/613 |
| 206688 | 10/1985 | Japan | 400/693 |
| 139776 | 6/1988 | Japan | 400/692 |

Primary Examiner—David A. Wiecking
Attorney, Agent, or Firm—Fields, Lewis, Pittenger & Rost

[57] ABSTRACT

Portable printing apparatus is disclosed that includes a portable, weather-proof housing adapted to be carried by a user as by a shoulder strap. The housing is made up of two separable housing sections joined at releasable interfitting weather-proof joints which contains and supports for transport a printer as well as the electric circuits including an onboard microprocessor on a circuit board to store data and operate the printer and a battery to power the circuits and printer. The housing has an access opening which enables sheets that are printed on to be placed in the housing. A combination sheet tray and support wall for the printer is releasably fastened to the inside of the housing. A slidable cover is mounted to slide in a wall of the housing and is arranged to cover the top of the tray and enclose and protect the sheets in the tray against the weather. The electric circuit enables command signals to be input to operate the printer and the microprocessor to store data to operate the printer.

32 Claims, 5 Drawing Sheets

Fig-13

PORTABLE PRINTING APPARATUS WITH MOVABLE PAPER FEED GATE

TECHNICAL FIELD

This invention relates to a novel and improved portable printing apparatus that is particularly suited for use where electric power from power lines is not readily available.

BACKGROUND ART

There is a need for a portable printing apparatus that can be readily carried by a user to any location needed, has relatively small power requirements as may be provided by a relatively small battery, will store selected data and will print out selected data in response to user commands to provide an on-location printed document. These uses include printing parking citations and printing out a variety of invoices and receipts such as those used by car rental companies to check in customers at the car site for fast car returns. In most instances, preprinted forms are used so that the on-location printing required is kept to a minimum to minimize the time and battery power required. In the past, printers suitable for this purpose have been relatively large and bulky and have used a rolled paper on a cylindrical drum.

DISCLOSURE OF THE INVENTION

Portable printing apparatus disclosed includes a portable, weather-proof housing which contains a printer and is readily carried by the user as with a shoulder strap to the location needed. The housing has an access opening which enables sheets on which printing is to be performed to be placed inside the housing and a discharge slot through which the printed sheets are discharged. The housing contains and has fixedly secured therein a sheet tray and shelf-like printer support wall, preferably formed as a one-piece body. The tray supports a fan-fold stack of sheets, preferably of the preprinted form type, having joined perforated portions along opposite edges of each sheet for tearing separation that are successively fed from the tray through a variable sized feed slot into the printer which is disposed on the support wall. In use, a top sheet of the stack is moved through the feed slot, through the printer which prints data at selected positions on the sheet in response to user commands. Electric circuits are provided on a circuit board in the housing which circuits include an inboard microprocessor. A variety of input devices including a hand-held programmed computer, transceiver, bar code or keyboard are suitable for connecting to the electric circuits for operating the printer to print data on the top sheet and move the printed top sheet through the discharge slot in the housing.

DETAILED DESCRIPTION

Referring now to the drawings, the portable printing apparatus 17 shown, in general, includes a portable housing 18 which contains a sheet and printer support assembly 19, a printer 21, a circuit board 22 and a DC battery 23 for supplying electric power to operate the apparatus. The housing 18 is readily carried to the point of use by the user and as shown has a pair of spaced loops 24 attached at opposite ends along one side to which a shoulder strap 25 has ends attached for carriage on the shoulder of the user or the like.

The housing 18 is made of two separable bottom and top housing sections 27 and 28, respectively. These sections are preferably made of a molded rigid plastic material. The bottom housing section 27 has a flat bottom wall 31 and a pair of spaced, side walls 32 and a pair of spaced end walls 33. The side walls and the end walls have edges that form an annular continuous peripheral edge to provide a continuous recessed tongue 34 that extends around the entire periphery of the side and end walls of the bottom housing section 27. Similarly, the top housing section 28 has a top wall 36, a pair of spaced side walls 37 and a pair of spaced end walls 38 with the periphery of the side and end walls having an edge formed with a series of spaced, channel-shaped or grooved portions 39 having a complementary shape with that of the tongue 34 to provide mating peripheral edges and a tongue and groove snap fit. An outer lip of portion 39 overlaps the tongue 34. These mating peripheral edges of sections 27 and 28 mechanically interlock to form a tight weather-proof joint between the housing sections and yet allow easy assembly and disassembly thereof.

Figure 12:
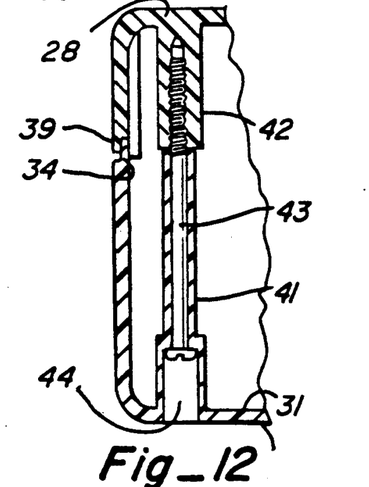
FIG. 12 is a sectional view taken along lines 12—12 of FIG. 4 showing the fastening screw for the housing sections.
Figure 13:
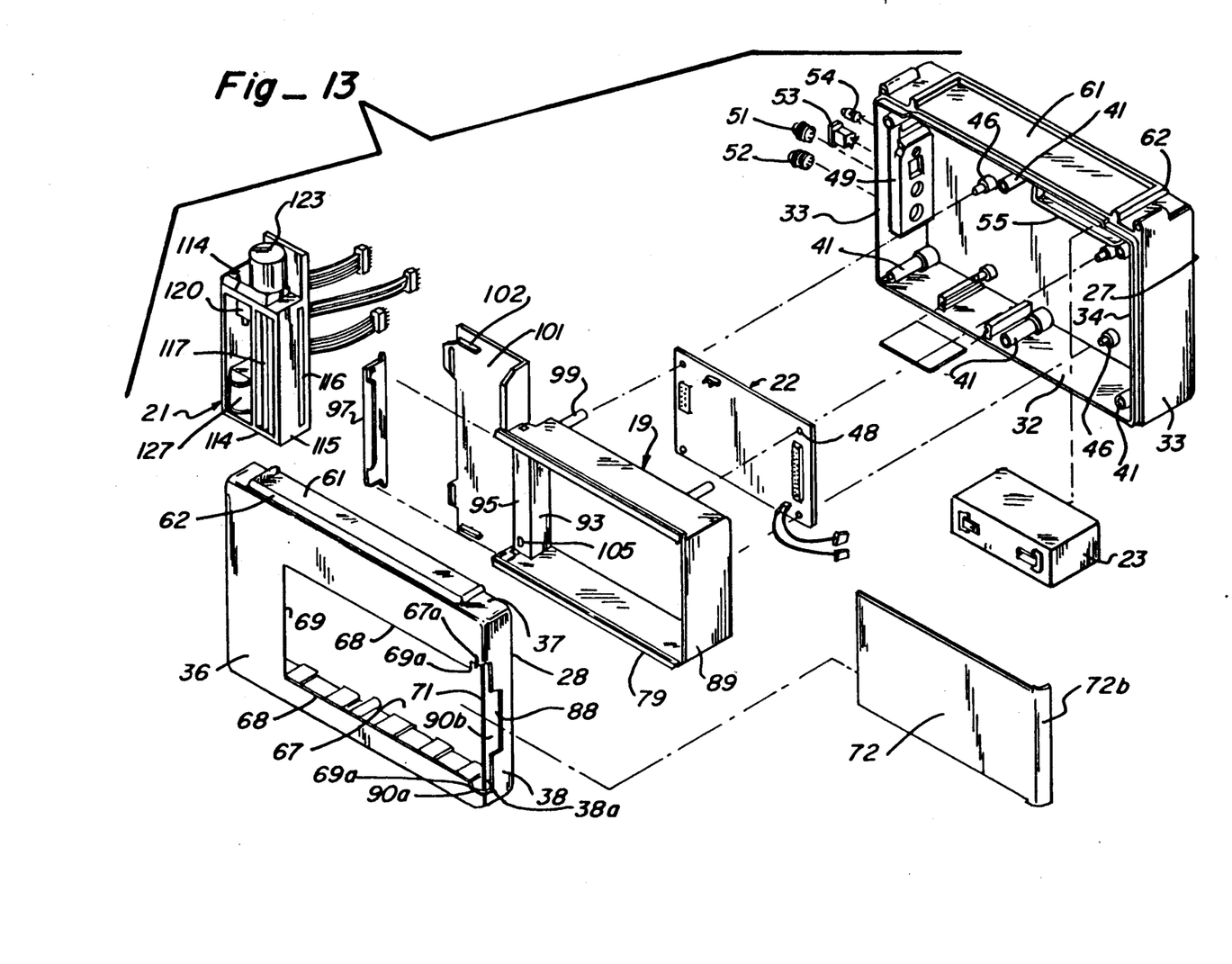
FIG. 13 is an exploded view of the printing apparatus shown in FIG. 1 that has been turned on its side.

To fasten the housing sections 27 and 28 against separation during use there is provided at the corners and midway between the corners of the bottom housing section 27, six hollow tubular members 41 that extend up from the bottom wall 31 and a corresponding six hollow tubular members 42 that extend down from the top wall 36. Associated ones of these tubular members are coaxially aligned and abut end to end when the sections are assembled. As seen in FIG. 12, a fastening screw 43 extends through an opening 44 in the bottom wall 31 and fits in an interior recess in the outer end of tubular member 41 and through the tubular members and threads into the upper tubular member 42 to releasably hold the bottom and top housing sections together. Each fastening screw 43 is readily unthreaded to enable the housing sections to be separated.

The bottom housing section 27 further has four spaced pins 46 upstanding from the bottom wall 31 with end portions 47 of reduced diameter to provide shoulders for supporting the circuit board 22 which in turn has openings 48 of slightly larger diameter than the end portions 47 to allow the board to slide over end portion 47 and rest on the shoulders of the pins and be readily installed into and removed from inside the housing. These end portions 47 also serve as a male coupling portion for locating and rigidly holding assembly 19 within the housing as described more fully hereafter.

One end wall 33 of the bottom housing section has a recessed end wall portion 49 that supports a control which includes an up switch 51, a down switch 52, an on-off switch 53 and a lamp 54 indicating the electric power is on. This control is used to control power to the electric circuitry on the circuit board and operate the printer 21 described hereafter. A rectangular arrangement of spaced, raised cleat portions 55 is disposed along the inside of the bottom wall 31 to form a cavity for removably supporting the DC battery 23 and holding same in place within the housing.

Figure 1:
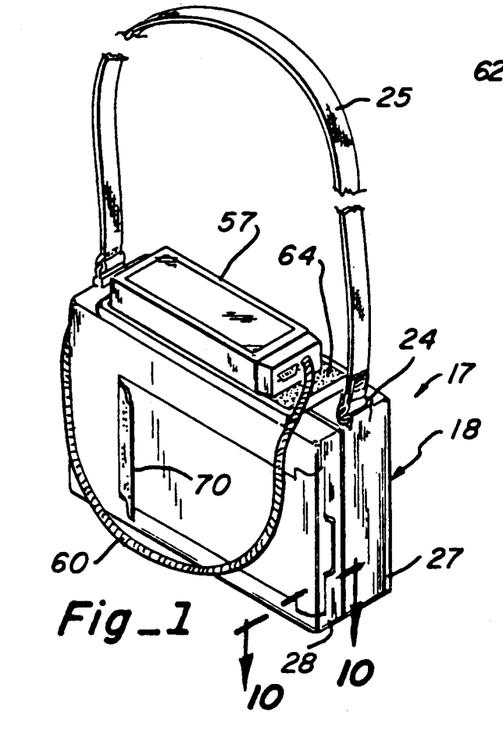
FIG. 1 is a perspective view of a portable printing apparatus embodying features of the present invention that has been turned on its side, is shown equipped with a hand-held computer and provided with a shoulder strap for carriage by the user to a selected point of use.
Figure 2:
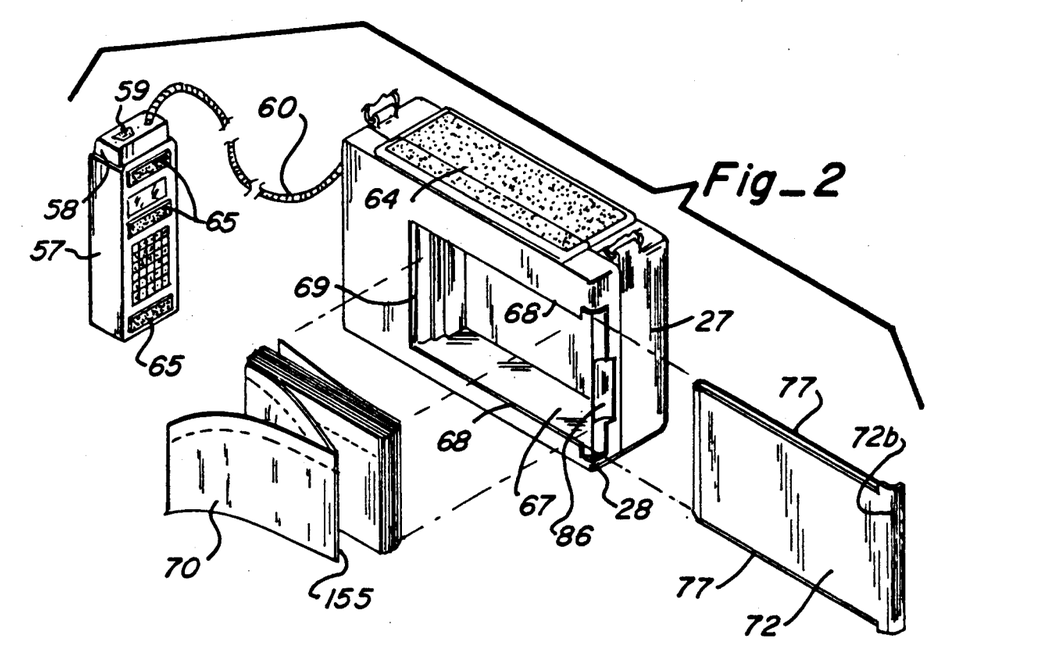
FIG. 2 is an exploded view of the printer shown in FIG. 1 that has been turned on its side showing a handheld computer separated from being attached to the housing, the cover in a removed position and the fanfold stack sheets of paper removed from the tray.
Figure 3:
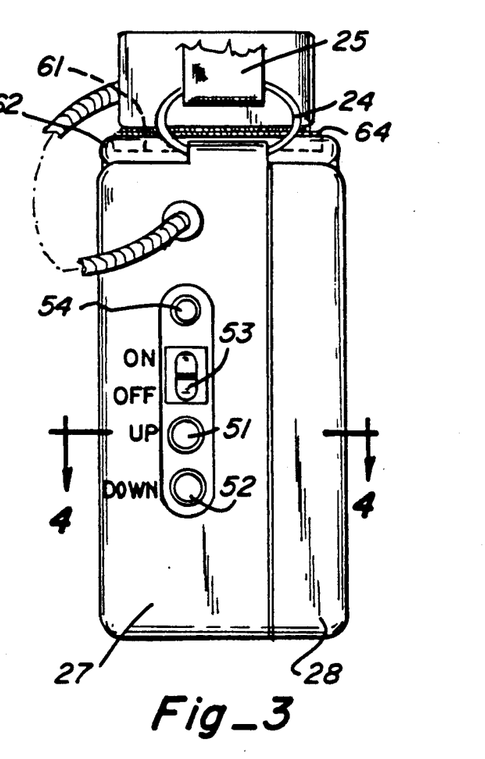
FIG. 3 is an end elevation view of the printing apparatus shown in FIG. 1.
Figure 4:
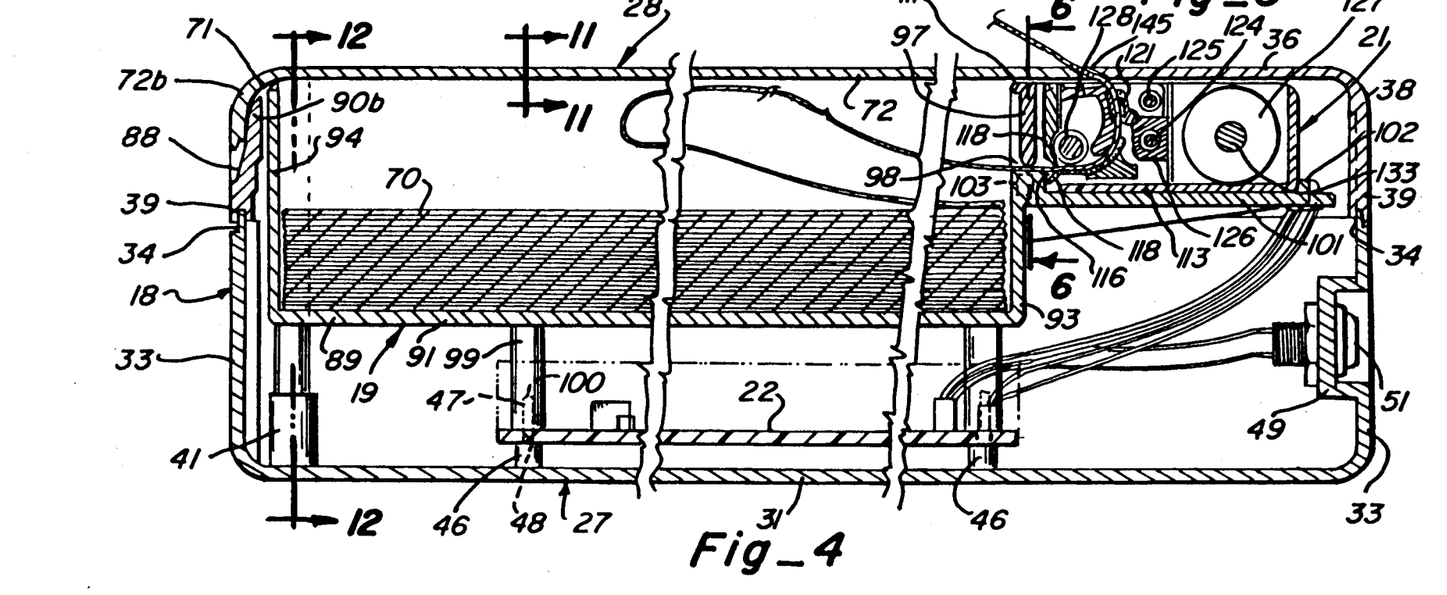
FIG. 4 is a sectional view taken along lines 4—4 of FIG. 3.

For the mounting of a portable hand-held computer 57 to the housing there is provided in adjacent side walls 32 and 37 of the bottom and top housing sections a raised, flat surfaced, side wall portion 61 having a raised bead 62 formed around the entire periphery of side wall portion 61 to form a rectangular recessed area that receives a loop detachable fastening strip 64 (FIGS. 2 and 3) that releasably engages a plurality of spaced complementary hook detachable fastening strips 65 carried by the portable hand-held computer 57. The fastening strips shown herein are "hook" and "loop" fasteners are commonly sold under the trademark VELCRO. To connect the computer 57 to the circuits on the circuit board 22 there is provided a hood 58 that fits over the end of the computer 57. This hood has a 9 pin "O" socket 59 for recharging the battery and uploading and downloading the computer 57. A retractable cord 60 has the wires to make the electrical connections between the circuits on the circuit board and hand-held computer 57.

The top housing section 28 has a generally rectangular access opening 67 which allows sheets of paper 70 to be inserted into the tray and is provided with a slide cover 72 to close the opening during use. The access opening 67 formed in the top wall 36 is in part defined by spaced inner side edges 68 and an inner end edge 69 set in a distance from one end wall 38. The access opening 67 has a wider end opening portion 67a opposite edge 69 providing stop edges 69a for the cover 72. An inner edge 71 of a recessed end wall portion 38a forms the side of the wider end opening portion 67a.

The cover 72 has a generally thin, flat main body portion 72a with an outside bevel 74 along an end edge 75 and an end portion 72b opposite end edge 75 and a pair of spaced parallel side edge portions 77. Each side edge portion 77 of the cover is reduced in thickness or stepped down by a cut in the top surface so that the spaced side edge portions are of reduced thickness and the top surface is flush with the housing.

Figure 11:
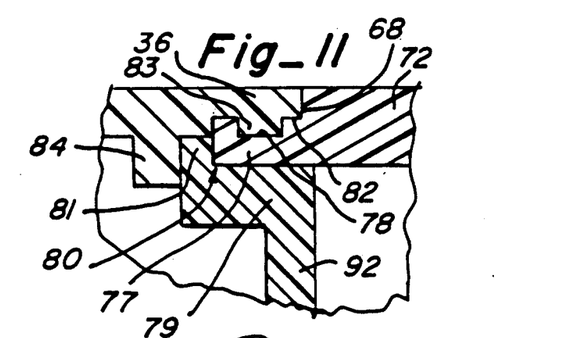
FIG. 11 is an enlarged sectional view taken along lines 11—11 of FIG. 4 showing one side edge of the cover retained for sliding movement in channel-like guide portions defined by the top wall of the housing and the tray.

The main body portion 72a has a pair of spaced side edge portions 77 of the cover which are supported for guided sliding movement in opposed, facing, channel-like guide portions 80 formed by surface portions of the top wall and tray. As best seen in FIG. 11, each guide portion 80 includes an inwardly extending overhanging wall surface portion 82 that overlaps an associated edge portion 77 of the cover. Each overhanging wall surface portion 82 has an inset depending flange 84 that fits down over a raised outer edge portion 81 on a top flange 79 of the tray to hold the top of the tray in place in the housing. There is further provided a groove 78 in the cover and a ridge 83 in the housing which are complimentary in shape and fit together. The top flanges 79 of the tray extend laterally out from the top side wall and the raised edge portions 81 are seen to define a channel-like tray guide in which the cover is slidably supported and guided during sliding movement. These opposed guide portions 80 on both sides of the access opening 67 confine and guide the side edges 77 of the cover 72 during sliding movement and form a weather-proof joint therebetween.

To accommodate cover end portion 72b the housing recessed end wall portion 38a defined by opposed recessed top wall portions 90a and recessed end wall portions 90b and the cover end portion 72b fits in and overlaps the recessed top wall portions 90a and recessed end wall portion 90b and cover end portion 72b is complementary in shape with the recessed end wall portion 38a and fits therein to be flush with the outer surface of the housing. A further recessed portion 88 in the end wall enables the user to engage the end portion of the cover to move it to an open position. The end portion 72b has an end groove 85 and the end wall 38 has an upstanding rib 86 complimentary in shape to the groove and these interfit to close off and weather-proof this end of the cover.

The cover 72 then fits in the housing in such a way as to make the inside of the housing weather-proof when the cover is closed. The cover closes the top of the tray by having both ends of the cover overlap or extend beyond the end walls of the tray.

Figure 5:
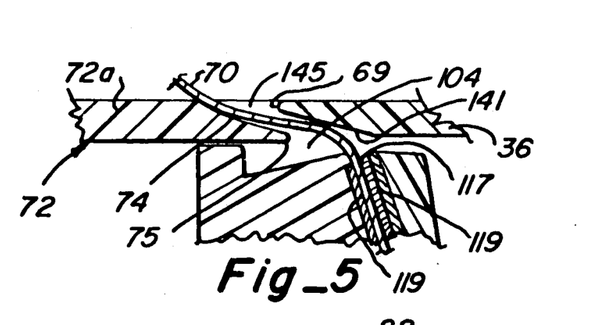
FIG. 5 is an enlarged sectional view of FIG. 4 showing the discharge portion of the printer and housing discharge slot for the printed top sheet.
Figure 6:
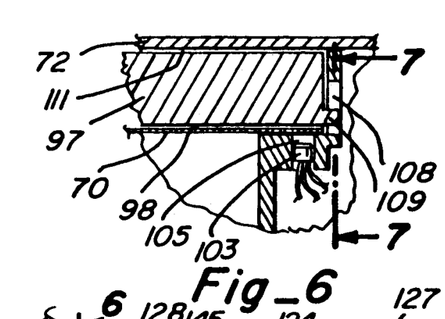
FIG. 6 is a sectional view taken along lines 6—6 of FIG. 4.
Figure 7:
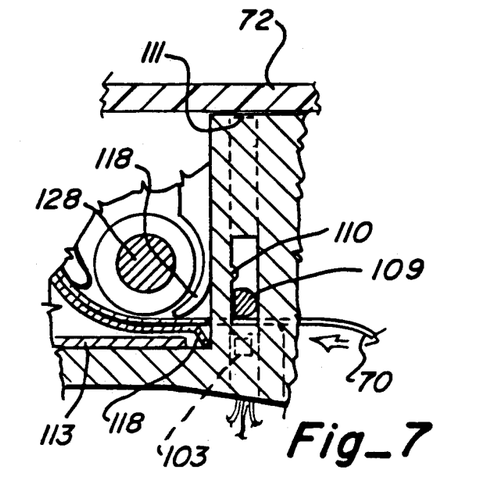
FIG. 7 is a sectional view taken along lines 7—7 of FIG. 6 with the movable gate in a lower operating position.

As seen in FIG. 5 the top wall 36 is provided with a tapered or inclined inner surface portion 141 that begins a selected distance from edge 69 and extends at an angle to a line perpendicular to the inside surface of top wall so that the thickness of the wall decreases toward edge 69 to direct the sheet discharging from the printer 21 through the discharge slot 145 in the housing. The inclined inner surface portion 141 avoids having the printed sheet strike the top wall at right angles thereto. The other edge of the discharge slot 145 is defined by edge 75 of the cover. Edge 75 and top wall edge 69 as viewed from the top define a very narrow discharge slot 145. The inclined inner surface portions 141 and bevel 74 then form an inclined discharge guide passage 104 leading to the discharge slot 145 that is defined by a pair of opposed surfaces at an angle to the inner surface of the wall of the housing. The width of the slot 145 which is kept to a minimum and this with the inclined passageway 104 using an overhanging top wall and inclined passageway aids in weather-proofing the housing during use.

The sheet and printer support assembly 19 includes a generally rectangular shaped tray 89 having a bottom wall 91, spaced side walls 92, a feed end wall 93, and a rear end wall 94. The feed end wall 93 has a top edge 95 terminating below the top of the side walls 92. A movable gate 97 is supported at its ends by the side walls with the top edge 95 of the feed end wall and the bottom edge of the gate defining a feed slot 98 through which a top sheet is passed. The tray 89 has four hollow legs 99 extending down from the bottom wall at the corners thereof with interior surfaces defining a female coupling portion 100 shaped and sized to slidably receive pin end portions 47 to provide a snap-fit female coupling portion for assembly 19 with the bottom housing section 27 and at the same time removably holding the circuit board 22 in place between the ends of portions 47 and legs 99. The legs 99 serve to position the top edge of the tray in the correct relation to the housing to form guide portions 80 above described.

A printer support wall 101 that extends out from the feed end wall 93 and the top surface of wall 101 is downstepped in relation to the top edge 95 of the tray so when the bottom surface of the base wall of the printer 21 is disposed thereon the sheet entry guides of the printer are in line with the top edge 95 for reliable feed. The printer support wall 101 has upstanding cleats 102 to locate the printer 21 thereon and hold it in place. A top-of-the-sheet sensor 103 is disposed in a recessed position in a cavity 105 in top edge 95.

Figure 8:
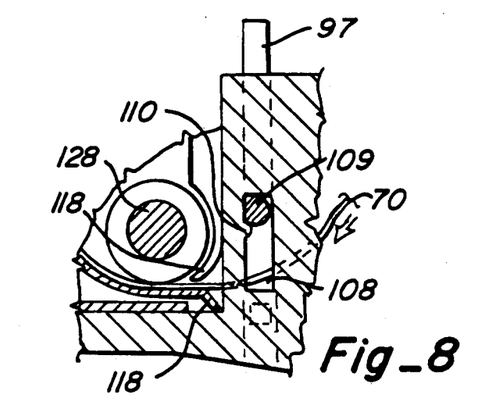
FIG. 8 is a sectional view taken along the same lines as FIG. 7 with the movable gate in a raised position.
Figure 9:
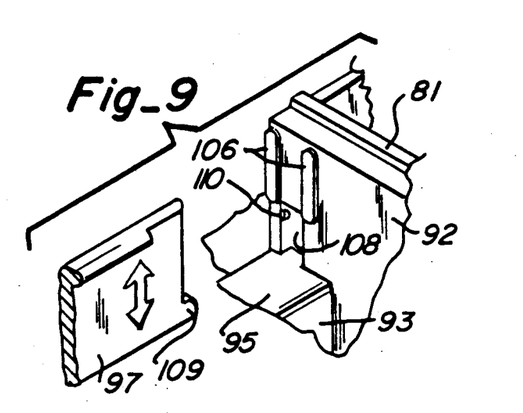
FIG. 9 is an enlarged perspective view showing the one end of the movable gate in a removed position and an associated supporting portion of a side wall of the tray.
Figure 10:
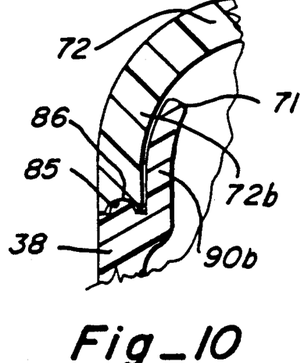
FIG. 10 is an enlarged sectional view showing one end of the cover.

The movable gate 97 is slidably confined in a pair of oppositely disposed channel-defining rib portions 106 along the inside edges of the tray side walls 92. A pair of oppositely disposed slots 108 are provided in the side walls 92 and pin-like end projections 109 on the ends of the movable gate slidably move in slots 108 to provide a slot-pin type coupling holding the movable gate in place and allowing the gate to be free to move up to a raised position and snap in a raised position as seen in FIG. 8 to enable paper to be fed when the cover is retracted or removed for passing of the end sheet therethrough. A tab 110 on the inside of the slot 108 holds the gate in the up position. The gate is of a selected height to provide a gap 111 between the cover 72 and top edge of the gate so that the gate is free to move up when the sheet is passed therethrough but the extent of upper movement is limited by the cover 72. This variable sized slot 98 is provided to allow the joined perforated edge portions of the connected sheets 70 to pass through.

The printer 21 shown is a Seiko model No. 411. This is a thermal eight-dot matrix printer and as shown has a support housing including a base wall 113, a pair of spaced end walls 114 extending up by the base wall and a pair of opposed side walls 115 extending up from the base wall. A sheet entry slot 116 is provided in one side wall 115 and a sheet discharge slot 117 is provided in the top of the housing at right angles to the sheet entry slot. An entry guide passage leading in from the entry slot 116 is defined by a pair of spaced entry guides 118 between which the sheet is passed as it enters the printer. A sheet discharge guide passage is defined by a pair of spaced discharge guides 119 leading to and defining the sheet discharge slot 117. The discharge guides 119 are disposed at an angle to a line perpendicular to the adjacent housing wall. A print head home switch 120 is provided to indicate when the print head 121 has reached a home position at one side.

For advancing or moving the sheet through the printer there is provided a sheet feed stepper motor 127 having an output shaft 133 connected through suitable gearing train to a sheet advance roller 128 mounted in the housing. For printing characters (letters and numerals) on the sheet a print head 121 is mounted on a guide shaft 125 to move back and forth transversely of the housing. The print head 121 receives input signals from the electric circuits on the circuit board 22 to effect the printing. The print head 121 is moved by the actuation of a print head stepper motor 123 mounted on the housing with the motor 123 driving a drive screw 124 that threads through an internally threaded portion 126 of the print head so that actuation of the print head stepper motor 123 will cause the printer head to move laterally in the housing to print at a selected position on the sheet. In the operation of the printer, each top sheet 70 then is passed from the tray 89 through the variable sized feed slot 98 through the printer 21 and out the housing discharge slot 145.

Figures 14, 15:
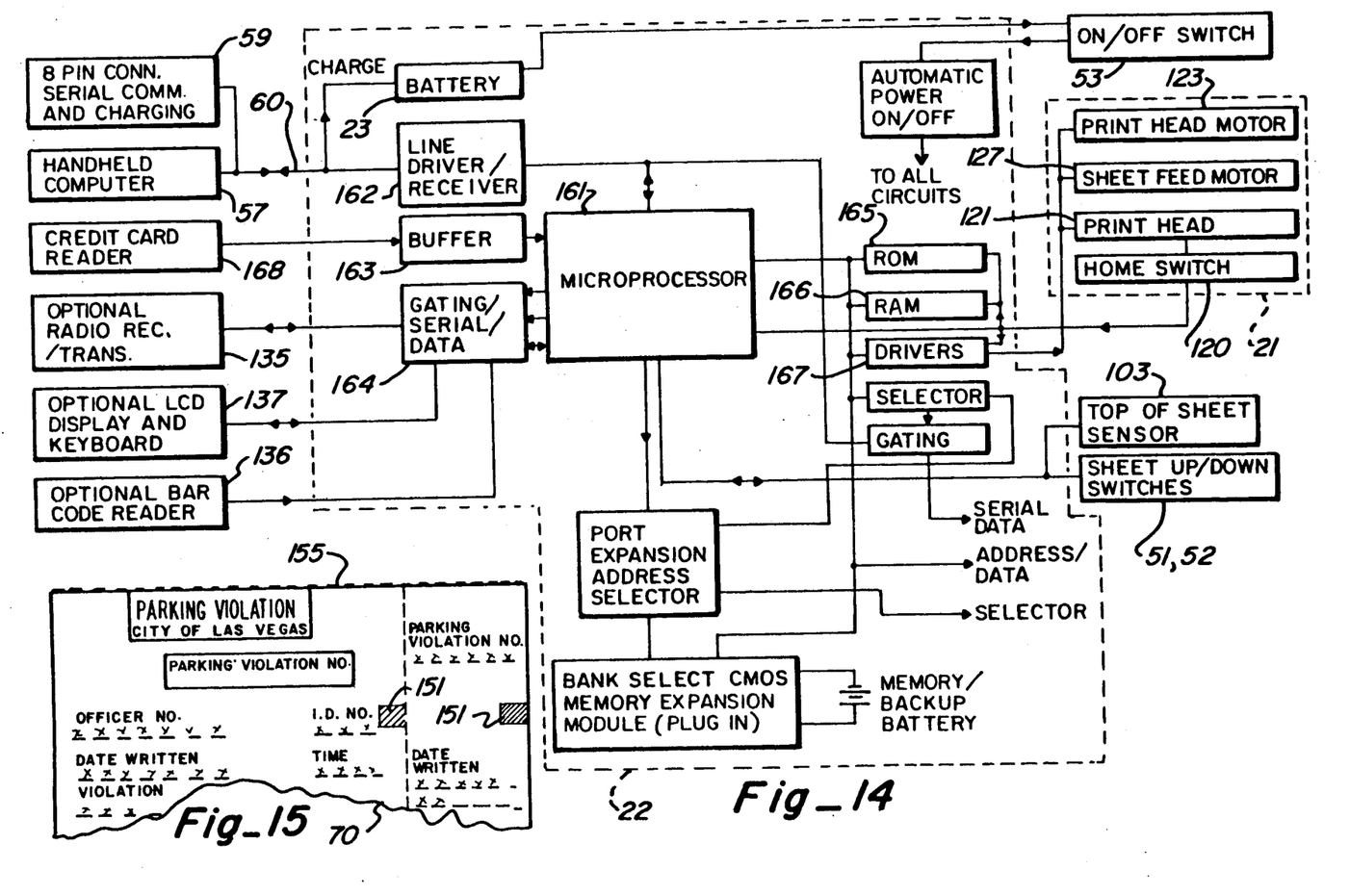
FIG. 14 is a schematic diagram showing electric circuits on the circuit board and the interconnections between the input devices, controls and printer of the apparatus shown in FIG. 1.
FIG. 15 is a plan view of an example preprinted sheet.

Referring now to FIG. 14, the electric circuits on the circuit board 22 are shown schematically. In general, the electric circuits on the circuit board 22 are responsive to selected input signals. Stored data in the circuits serves to actuate the print head 121 to print data on the top sheet 70 and also move the top sheet 70 through the printer and discharge the top sheet from the housing. The electric circuits include an onboard microprocessor 161 such as a 6303A or BOC88 chip with a line driver/receiver 162, a buffer 163 and gating/serial/data 164 at the input and the usual ROM 165 and RAM 166 and drivers 167 normally associated with such a microprocessor and the particular printer 21 shown. This microprocessor is programmed to operate the printer and print at selected locations on the sheet. The sheet preferably is a preprinted form such as that shown in FIG. 15 for traffic citations. In this instance, the microprocessor is programmed with data on vehicle license holders, etc. Another input device is a credit card reader 168 for some applications. The portable hand-held computer 57 is shown coupled to the circuit board via a flexible cord 60. The hand-held computer 57 has the 9 pin connector socket 59 for serial communication and battery charging and utilizes an RS232 serial output. This input device 57 has the usual keyboard that is actuated to input data. Alternatives or options to the hand-held computer 57 may be a radio receiver/transmitter 135, bar code reader 136, an LCD display and keyboard 137 and the like. The DC battery 23 provides power to the circuits on the circuit board. The output of the driver 167 from the microprocessor is connected to the sheet feed motor 127, print head motor 123, and the print head 121. The home switch 120 connects to the print head and to the microprocessor 161. The top-of-sheet sensor 103 connects to the microprocessor 161. The on-off switch 53 controls power from the battery to the circuit and the up/down switches 51 and 52 connect to the microprocessor 161 and control the direction of the movement of the print head 121.

The example sheet 70 shown in FIG. 15 formed as a part of the sheet stack shown has joined perforated portions 155 at each end along which the sheet is torn. The sheet has printing at selected locations or selected areas thereof and the parts with "x's" designate areas the printer will print. The sheet is marked with two spaced dark rectangular markings 151 that cause the top-of-sheet sensor 103 to be triggered when the top portion of sheet 70 passes through feed slot 98.

In the operation, the information to be printed is input through the input device and printed out upon command. The print head 121 prints on the sheet and the print roller 128 moves the paper which comes through the housing discharge slot 145. The printed top sheet is torn off along the formed perforated portions 155 using edge 69 of the housing.

Although the present invention has been described with a certain degree of particularity, it is understood that the present disclosure has been made by way of example and that changes in details of structure may be made without departing from the spirit thereof.

What is claimed is:

1. In a portable printing apparatus including a printer, the combination comprising:

a housing for containing and supporting a printer, said housing having first and second separable sections with opposed first and second walls and mating peripheral edges that releasably interfit with one another to close the housing along said peripheral edges, said housing having an access opening to admit into said housing printing sheets in a fan-fold stack having joined perforated edge portions defining perforations for tearing separation of the sheets and a cover for covering said access opening during use, said housing having a discharge slot through which each sheet is discharged after having printing performed thereon, and sheet and printer support means mounted in said housing including a tray with an opening for receiving and supporting said stack, said tray opening being covered by said cover during use, a shelf-like support wall extending beyond a wall of said tray for supporting a printer and a movable feed gate adjacent an edge surface of said tray wall supported for bidirectional movement relative to said edge surface defining a sheet feed slot of a variable size to allow said perforations to pass through said feed slot as a succession of said sheets are passed from said stack through said feed slot, through said printer and out said discharge slot, said tray including spaced side walls and spaced end walls, one of said end walls having a top edge terminating below the top edge of the side walls, said movable feed gate having ends and being slidably supported at said ends by said side walls with said top edge of said one end wall and a bottom edge of said gate defining said sheet feed slot, said ends of said gate being slidably confined in a pair of opposed facing channel means along the inside of said side walls and including a slide coupling means slidably interconnecting the ends of said gate with said side walls, said slide coupling means having cooperating means to hold said gate in a raised position when the cover is retracted to facilitate feeding of the top sheet of said stack into the printer.

2. In a portable printing apparatus including a printer, the combination comprising:

a housing for containing and supporting a printer, said housing having first and second separable sections with opposed first and second walls and mating peripheral edges that releasably interfit with one another to close the housing along said peripheral edges, said housing having an access opening, printing sheets admitted into said housing through said access opening, said printing sheets being in a fan-fold stack having joined perforated edge portions defining perforations for tearing separation of the sheets and a cover for covering said access opening during use, said housing having a discharge slot through which each sheet is discharged after having printing performed thereon, and sheet and printer support means mounted in said housing including a tray with an opening for receiving and supporting said stack, said tray opening being covered by said cover during use, a shelf-like support wall extending beyond a wall of said tray for supporting a printer and a movable feed gate adjacent an edge surface of said tray wall supported for free bi-directional movement relative to said edge surface defining a sheet feed slot of a variable size to allow said perforations to pass through said feed slot as a succession of said sheets are passed form said stacks through said feed slot, through said printer and out said discharge slot, said tray including spaced side walls and spaced end walls, one of said end walls having a top edge terminating below the top edge of said side walls, said movable feed gate having opposite ends slidably confined in a pair of opposed facing channel means along the inside of said side walls with said top edge of said one end wall and a bottom edge of said gate defining said feed slot.

3. In apparatus as set forth in claim 2 including fastening means for holding said two separable housing sections together.

4. In apparatus as set forth in claim 2 wherein said mating peripheral edges of said housing sections mechanically interlock to form a weatherproof joint between said sections.

5. In apparatus as set forth in claim 2 wherein said housing has an inclined inside surface portion adjacent said discharge slot to direct a sheet on which printing has been performed through said discharge slot.

6. In apparatus as set forth in claim 5 wherein an end edge of said cover forms a side of said discharge slot, said cover being beveled along an outer surface extending inwardly from said end edge, said inclined inside surface portion and said beveled edge defining an inclined passageway in said housing leading to said discharge slot through which the printed sheet is passed.

7. In apparatus as set forth in claim 1 including a battery in said housing and wherein said housing has raised cleat means along an inside surface to releasably hold said battery inside said housing, said battery providing the power to operate said printer.

8. In apparatus as set forth in claim 2 wherein said housing has a first coupling portion disposed on an inside surface of said housing that interfits with a second coupling portion on said sheet and printer support means for releasably attaching said sheet and printer support means to the inside said housing.

9. In apparatus as set forth in claim 1 wherein one of said first and second housing sections has a transverse wall connected to and extending transverse to an associated of said opposed first and second walls for said one housing section, said transverse wall having said access opening, said cover having a main body portion and a pair of spaced side edge portions, said tray and said transverse wall having opposed, spaced surface portions defining a pair of opposed facing channel-like guide portions in which said side edge portions of said cover are slidably received, said side edge portions, said tray, and said transverse wall mechanically interlock to form a weather-tight joint.

10. In apparatus as set forth in claim 9 wherein said transverse wall has an inwardly extending overhanging wall surface portion that overlaps an associated side edge portion of said cover.

11. In apparatus as set forth in claim 10 wherein said overhanging wall surface portions has a pair of parallel spaced depending flanges that fit down over and extend along the outer edges of said tray to hold the tray in place relative to the housing.

12. In apparatus as set forth in claim 9 wherein said transverse wall has interfitting, complementary shaped grooves and ridges in said overhanging wall portions and said cover.

13. In apparatus as set forth in claim 9 including a raised edge portion on said tray opposite said transverse wall, said raised edge portions defining a channel-like tray guide in which the cover is slidably supported and guided during sliding movement.

14. In apparatus as set forth in claim 9 wherein said housing has opposed recessed top wall portions and a recessed end wall portion at one end of said access opening and said cover has an end portion that fits in and overlaps said recessed top wall portion and recessed end wall portion to form a part of a weatherproof joint between said cover and housing, the outer surface of said end portion being flush with the outer surface of said housing when the cover is in the closed position.

15. In apparatus as set forth in claim 14 including a finger recess in said recessed end wall portion to enable the user to engage the end of the cover to move the cover to an open position.

16. In apparatus as set forth in claim 2, said tray and support wall are formed as an integral one-piece body.

17. In apparatus as set forth in claim 2 and further including a slide coupling means slidably interconnecting the ends of said gate with said side walls.

18. In apparatus as set forth in claim 1 wherein said slide coupling means include a pair of opposed projections extending out from the ends of said gate, a pair of slots in said tray in which the projections move, said cooperating means including a raised tab in each said slot that holds the projections in said raised position.

19. In apparatus as set forth in claim 2 wherein said printer support wall is positioned a selected distance from said edge surface to align said sheet feed slot with a sheet feed slot of the printer.

20. In apparatus as set forth in claim 2 including a sheet sensor recessed in said edge surface, the extent of movement of said gate away from said edge surface being limited by an inside surface of said housing to enable said sheet sensor to sense the sheet at all times.

21. In apparatus as set forth in claim 2 further including electric circuit means mounted on a board in said housing and coupled to said printer for use in controlling the operation of the printer in response to input commands by the user.

22. In apparatus as set forth in claim 21 wherein said electric circuit means includes a programmed microprocessor for receiving input data from selected input devices, storing data and controlling the location of characters printed by the printer on the sheet.

23. In apparatus as set forth in claim 21 wherein one of said first and second housing sections has a transverse wall connected to and extending transverse to an associated of said first and second walls for said one housing section with said board being removable fastened between said sheet and printer support means and said transverse wall the inside of sad housing.

24. In apparatus as set forth in claim 22 including a hand-held computer to input data into said microprocessor.

25. In apparatus as set forth in claim 22 including a radio receiver/transmitter to input data into said microprocessor.

26. In apparatus as set forth in claim 22 including a keyboard to input data into said microprocessor.

27. In apparatus as set forth in claim 22 including a bar code reader to input data into said microprocessor.

28. In apparatus as set forth in claim 2 including control means on the housing operable by the use to enable the user to start the printer and to advance or retract each sheet through the printer.

29. In a portable printing apparatus, the combination comprising;
a printer,
a housing for containing and supporting said printer, said housing having first and second separable sections with opposed first and second walls and mating peripheral edges that releasably interfit with one another to close the housing along said peripheral edges, said housing having an access opening, printing sheets admitted into said housing through said access opening, said printing sheets being in a fan-fold stack having joined perforated edge portions defining perforations for tearing separating and a cover for covering said access opening during use, said housing having a discharge slot through which each sheet is discharged after having printing performed thereon,
sheet and printer support means mounted in said housing including a tray with an opening for receiving and supporting said stack, said tray opening being covered by said cover during use, a shelf-like support wall extending beyond a wall of said tray for supporting said printer and a movable feed gate adjacent an edge surface of said tray wall supported for free bi-directional movement relative to said edge surface defined a sheet feed slot of a variable size to allow said perforations to pass through said feed slot as a succession of said sheets are passed from said stack through said feed slot, through said printer and out said discharge slot, said tray including spaced side walls and spaced end walls, one of said end walls having a top edge terminating below the top edge of said side walls, said movable feed gate having opposite ends slidably confined in a pair of opposed facing channel means along the inside of said side walls with said top edge of said one end wall and a bottom edge of said gate defining said feed slot,
electric circuit means mounted on a circuit board in said housing and coupled to said printer for use in controlling the operation of said printer,
a battery mounted in said housing for providing electric power,
control means on the housing operable by the user to regulate the power to said electric circuit means and to operate said printer, and a top of sheet sensor connected to said electric circuit means and recessed in said edge surface to sense the top of each sheet passed through said slot.

30. In portable printing apparatus, the combination comprising:

a printer, a portable weather-proof housing containing said printer, said housing having two separable sections with opposed top and bottom walls that have mating peripheral edges that releasably interfit one within another to close the housing along said peripheral edges, said housing having an access opening, printing sheets admitted into said housing through said access opening, said printing sheets being in a fan-fold stack having perforated edge portions joining the sheets, said housing having a sliding cover for covering said access opening during use, said cover being movable between a closed position in which an end edge of said movable cover forms one side of said discharge guide slot and an open position to allow the insertion of sheets of paper to said tray, said housing having a sheet discharge slot through which a printed sheet is passed, said tray including spaced side walls and spaced end walls, one of said end walls having a top edge terminating below the top edge of said side walls, said movable feed gate having opposite ends slidably confined in a pair of opposed facing channel means along the inside of said side walls with said top edge of said one end wall and a bottom edge of said gate defining said feed slot, sheet and printer support means in said housing including a tray arranged for supporting said stack and a printer support wall extending beyond a wall of said tray, said printer being mounted on said support wall, electric circuit means on a circuit board in said housing, means for receiving input signals and providing output signals to control a printing operation of said printer, said electric circuit means including a programmed microprocessor for receiving input data from selected input devices, storing data and controlling the location of characters printed by the printer on the sheet, and a portable hand-held computer coupled to said electric circuit means having a keyboard for inputting data to operate said printer.

31. In portable printing apparatus as set forth in claim 30 including a first fastening portion on said housing and a second fastening portion on said computer to releasably fasten said computer to said housing.

32. In portable printing apparatus as set forth in claim 31 wherein said fastening portions are hook and loop detachable fastening strips that releasably fasten to one another.

* * * * *